United States Patent [19]
Sato

[11] Patent Number: 5,445,247
[45] Date of Patent: Aug. 29, 1995

[54] DAMPING UNIT

[75] Inventor: Hideyuki Sato, Gunma, Japan

[73] Assignee: NSK Ltd., Tokyo, Japan

[21] Appl. No.: 219,715

[22] Filed: Mar. 29, 1994

[30] Foreign Application Priority Data

Mar. 30, 1993 [JP] Japan .................. 5-071929

[51] Int. Cl.⁶ .......................................... B23Q 11/00
[52] U.S. Cl. ................. 188/266; 188/322.5; 267/136
[58] Field of Search ............ 188/266, 268, 272, 322.5, 188/382; 267/136, 137, 64.11, 64.15, 64.23, 64.27, 113, 140.11, 141, 186, 217, 220, 223, 292, 295; 901/29, 28, 49

[56] References Cited

U.S. PATENT DOCUMENTS

| 3,052,324 | 9/1962 | Bowditch | 188/322.5 |
| 3,221,843 | 12/1965 | Seed | 188/266 |
| 4,580,941 | 4/1986 | Inaba et al. | 901/49 X |

FOREIGN PATENT DOCUMENTS

| 0038239 | 2/1986 | Japan | 188/322.5 |
| 1138636 | 5/1989 | Japan | |
| 2279293 | 11/1990 | Japan | |

Primary Examiner—Robert J. Oberleitner
Assistant Examiner—Peter M. Poon
Attorney, Agent, or Firm—Sughrue, Mion, Zinn, Macpeak & Seas

[57] ABSTRACT

A damping unit comprising: a mass body supported at a position close to a shaft end of an operating shaft in such a manner as to be movable in a direction orthogonal to an axis of the operating shaft, the operating shaft of a working head; wirelike resilient members, an end of each resilient member supporting the mass body, the other end thereof being fixed in parallel with the axis of the operating shaft; fluid chambers disposed so as to enclose the resilient members; and a high-viscosity fluid being charged into the fluid chambers.

6 Claims, 8 Drawing Sheets

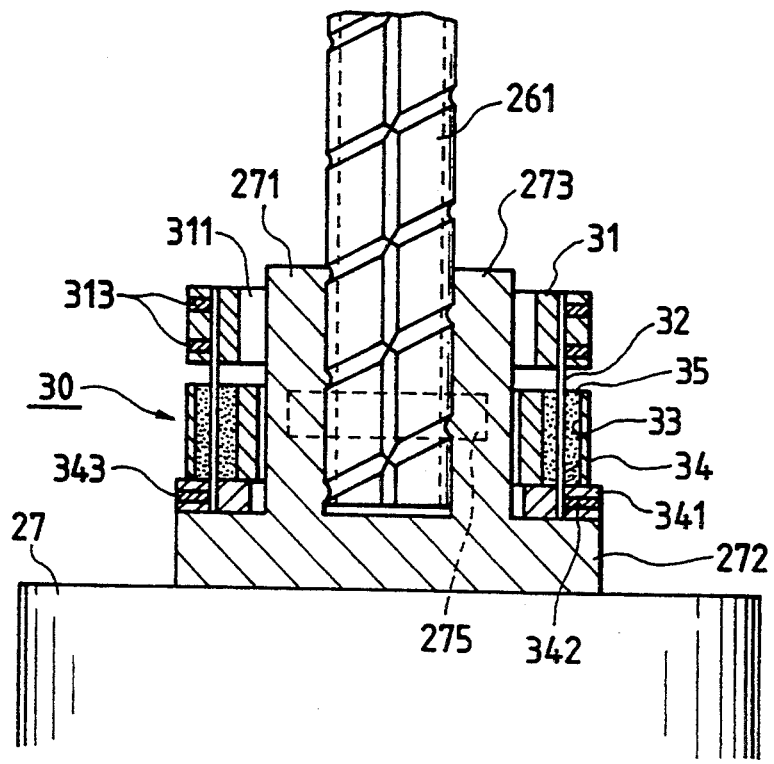
FIG. 6
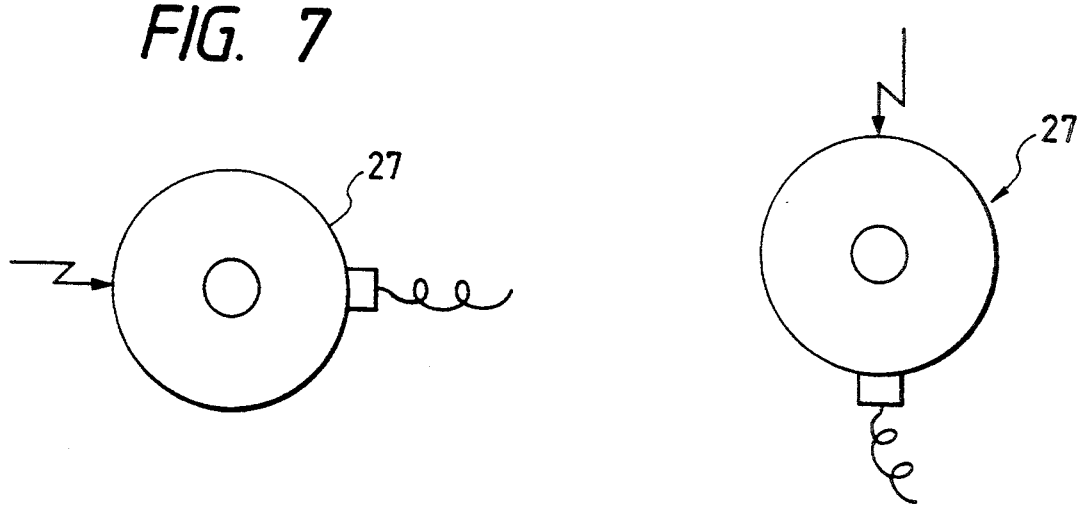
FIG. 7
FIG. 10

FIG. 13
FIG. 14
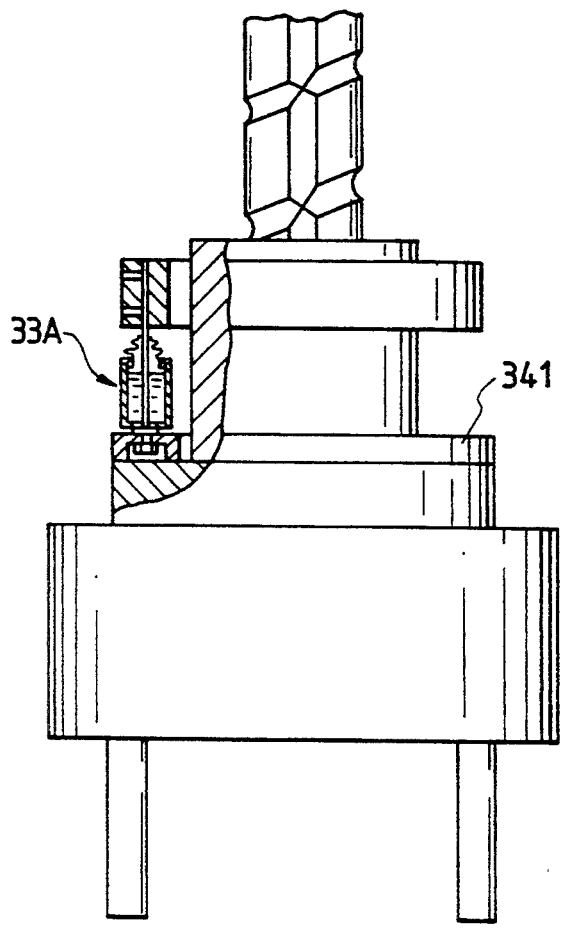
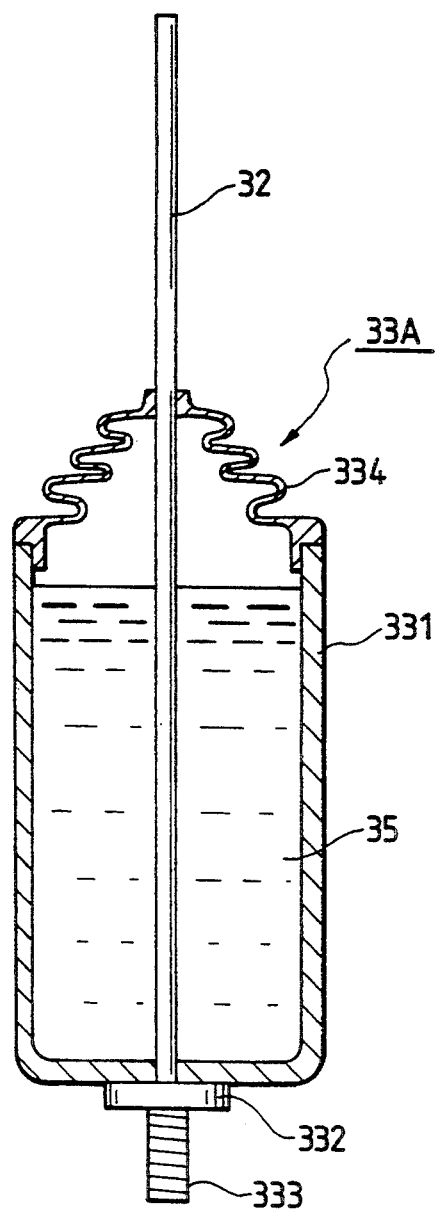

DAMPING UNIT

BACKGROUND OF THE INVENTION

The invention relates to damping units, and more particularly, to a damping unit adapted to suppress vibration at the distal end of a cantilevered rotating hollow shaft used for positioning, such as the distal end of a hand of a robot.

When a cantilevered structural body such as the distal end of a robot hand performs the positioning operation, low-frequency residual vibration caused at the distal end at the time the positioning operation has been stopped is often considered as a problem. Persistence of such residual vibration leads to unstable stoppage, so that it becomes time-consuming to put the robot hand in stability. As a result the working cycle is increased. To overcome this problem, the static rigidity of the structural body is usually increased to control the vibration. However, an increase in the static rigidity of the cantilevered structural body increases the weight of the apparatus as a whole, which is not desirable.

If a damper is used to control vibration, the problem of increased weight becomes substantially negligible. A conventional vibration absorbing damper of this type is disclosed in, e.g., Japanese Utility Model Unexamined Publication No. 1-138636. FIG. 15 shows such vibration absorbing damper 1 applied to a deburring device attached to the distal end of an arm of a robot. A first flange 4 is fixed on a support cylinder 3 that rotatably supports a tool 2, the first flange 4 being made of a vibration absorbing member such as urethane rubber. A second flange 7 is mounted on the first flange 4 by interposing bolts 5 therebetween to provide a distance in the axial direction. A notch 8 is arranged in a central portion of the second flange 7, so that the support cylinder 3 can move as the first flange 4 is deformed. The deburring operation is performed with the tool 2 by first attaching the vibration absorbing damper 1 to the second flange 7 that is secured to the distal end of the robot hand and then rotating a drive shaft 9. Since the vibration of the tool 2 is absorbed by the rubber material of the first flange 4, the vibration transmitted to the robot body can be reduced.

Further, Japanese Patent Unexamined Publication No. 2-279293 proposes an idea that a vibration absorbing damper is mounted on a speed reducing mechanism for a robot. FIG. 16 shows a joint of the robot to which the speed reducing mechanism is applied. A rotating machine 12 is secured to a joint support portion 11, and one end of a robot arm 16 is rotatably mounted on a rotating shaft 12a of the rotating machine 12 through first and second speed reducers 13, 14 and a damper 15. The speed reduction ratios of both first and second speed reducers are equal. Each of the speed reducers 13, 14 is of, e.g., a flat harmonic drive type. The fixed-side discs of both speed reducers are fixed on the joint support portion 11, and the input shafts thereof are connected to the rotating shaft 12a. The output shaft of the first speed reducer 13 is connected to a rotatably supported damper load 17; the output shaft of the second speed reducer 14 is connected to the robot arm 16; and the robot arm 16 and the damper load 17 are coupled to each other by the disc type rotating damper 15. The resonance frequency caused by the first speed reducer 13 and the damper load 17 is set to a frequency higher than that caused by the second speed reducer 14 and the robot arm 16. The rotating damper 15 is of such a structure that a partitioning disc and an orifice disc are combined so as to alternate with each other and a viscous fluid such as machine oil is sealed in the inside thereof. When the two discs rotate relative to each other, the viscous resistance grows as the viscous fluid passes past the orifice, thereby functioning as a rotating damper. By connecting the damper load 17 to the robot arm 16 with this rotating damper 15, damping effects act on the relative movement of the damper load 17 and the robot arm 16 produced in the vicinity of the resonance frequency of the robot arm 16, thereby controlling the vibration of the robot arm 16.

However, the conventional vibration-controlling damper has addressed the problem that low-frequency vibration cannot be sufficiently suppressed.

While a dynamic damper is known as a damper that can effectively control low-frequency vibration, no such dynamic damper as to be applicable to a rotating hollow shaft such as a robot hand has not heretofore been proposed. Therefore, dynamic dampers have not been used for robot hands.

SUMMARY OF THE INVENTION

It is therefore the object of the invention to provide a damping unit capable of suppressing low-frequency residual vibration effectively to achieve sufficient damping and not increasing the weight of the apparatus as a whole by forming the damping unit into a dynamic damper whose structure is applicable to a cantilevered rotating shaft such as a robot hand.

To achieve the above object, the invention is applied to a damping unit that includes: a mass body supported at a position close to a shaft end of an operating shaft in such a manner as to be movable in a direction orthogonal to an axis of the operating shaft, the operating shaft having a working head; wirelike resilient members, an end of each resilient member supporting the mass body, the other end thereof being fixed in parallel with the axis of the operating shaft; fluid chambers disposed so as to enclose the resilient members; and a high-viscosity fluid being charged into the fluid chambers.

The mass body and the resilient members pivotably supporting the mass body, which constitute the dynamic damper, can be arranged about the rotating operating shaft such as a robot hand. Further, by adjusting the ratio in weight between the mass body and the working head as well as the spring constant of the resilient members, not only the natural vibration of the dynamic damper can be determined to an optimal value (optimal synchronization), but also the damping coefficient can be determined to an optimal value (optimal damping) with ease. Thus, a sufficient damping performance is ensured to low-frequency residual vibration. In addition, the viscous resistance of the fluid provided around the resilient members allows the dynamic damper to give vibration absorbing effects thereof almost to a full play.

Still further, the simple design of the damping unit allows the damping function to be performed sufficiently, so that it is not necessary for the cantilevered structural body such as a robot hand to increase static rigidity, thus contributing to making the apparatus light.

BRIEF DESCRIPTION OF THE DRAWINGS

FIG. 6 is a sectional view taken along a line VI—VI of FIG. 5;

FIG. 7 is a diagram showing a direction in which vibration is applied by an exemplary impulse response of a robot hand of FIG. 1;

FIG. 10 is a diagram showing a direction in which vibration is applied by an impulse response when a phase of vibration is shifted from that in FIG. 7;

FIG. 13 is a partially cutaway sectional view showing a damping unit, which is another embodiment of the invention;

FIG. 14 is a partially enlarged sectional view of FIG. 13;

DETAILED DESCRIPTION OF THE PREFERRED EMBODIMENTS

Preferred embodiments of the invention will now be described with reference to the accompanying drawings.

Figure 1:
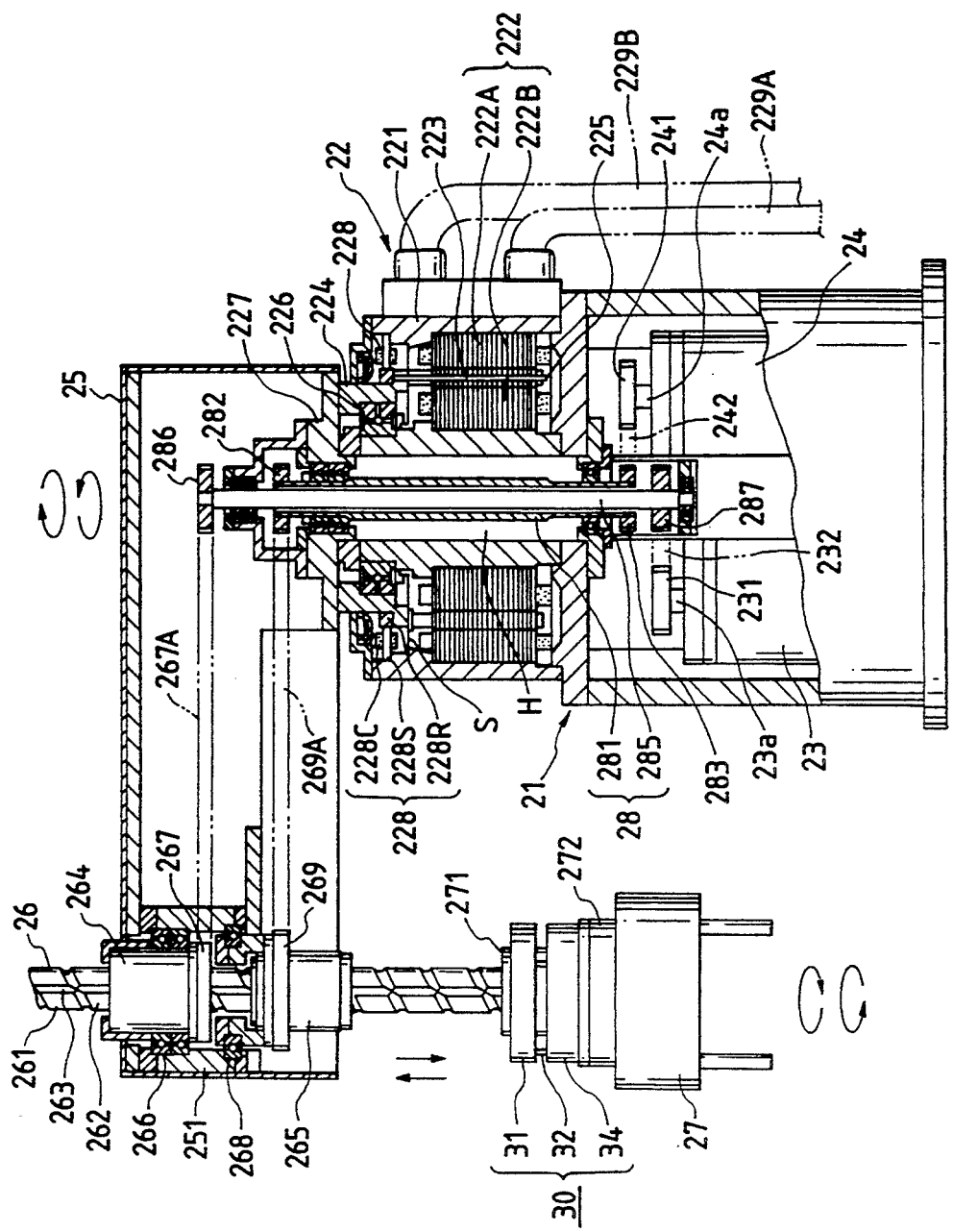
FIG. 1 is a sectional view of a robot to which a damping unit, which is an embodiment of the invention, is applied.

FIG. 1 is a sectional view of a working robot to which a damping unit, which is an embodiment of the invention, is applied. A direct drive motor 22 and two dc motors 23, 24 are provided at a base portion 21 of the working robot. A first arm 25 is mounted on an output shaft of the direct drive motor 22 so as to be horizontally rotatable. A second arm 26 formed of a ball-bearing leadscrew shaft is disposed on a distal end of the first arm 25 so as to be vertical thereto. A hand 27, which is a working head, is provided on a distal end of the second arm 26. A damping unit 30 is installed to the hand 27.

The direct drive motor 22 is of, e.g., a variable reluctance type, and has within a cylindrical housing 221 two concentrically disposed inner and outer cylindrical stators 222, a rotor 223 concentrically disposed between the two stators, and an empty hole H in a central portion. The outer stator 222A and the inner stator 222B have rakelike magnetic poles, each having an array of teeth, projected equidistantly in a circumferential direction on the inner circumference and the outer circumference, respectively, with each magnetic pole coiled to form an electromagnet. The arrays of teeth on the two magnetic poles adjacent to each other are disposed a predetermined pitch out of phase. On the other hand, the rotor 223 is formed so that salient teeth are uniformly arranged on both inner and outer circumferences thereof so as to confront the arrays of teeth on the magnetic poles of the respective stators 222A, 222B at a pitch different from that of the arrays of teeth on the magnetic poles. A rotation output shaft 224 is integrally coupled to the rotor 223 by a bolt 225, and is rotatably supported through a cross roller bearing 226. A dividing table 227 is fixed on the upper end of the output shaft 224 of the rotor 223.

A built-in resolver 228 is arranged in an empty chamber above the outer stator 222A. The resolver 228 is a high-resolution rotation detector for positioning the rotation of the rotor 223 with high accuracy, and is separated from the outer stator 222A by a magnetic shield plate S.

A resolver stator 228S having a resolver coil 228C is fixed on the housing. A resolver rotor 228R is mounted on the output shaft 224 so as to confront the resolver stator 228S. Similar to the stator 222 of the motor, the resolver stator 228S has a plurality of magnetic poles, each having an array of teeth. The resolver coil 228 C is arranged around each magnetic pole. Similar to the rotor 223 of the motor, the resolver rotor 228R has salient teeth at a predetermined pitch so as to confront the arrays of teeth of the resolver stator 228S. When the resolver rotor 228R is rotated integrally by the rotation of the rotor 223 of the motor, reluctance between the teeth of the resolver stator 228S changes. By digitizing such change by a resolver control circuit of a not shown drive unit and using the digitized signal as a position signal, the angle of rotation of the rotor 223, i.e., the rotational position of the rotor is detected with high accuracy. In FIG. 1, reference characters 229A and 229B designate electric wirings of the motor and the resolver, respectively.

Although not shown, a clamp mechanism of the dividing table 227 is mounted on the direct drive motor 22.

The first arm 25 is mounted on the dividing table 227 of the direct drive motor 22 so as to be integrally rotatable.

A rotating shaft 28 that is of a double shaft structure is arranged vertically in the empty hole H in the central portion of the direct drive motor 22. The rotating shaft 28 is supported by the motor housing 221 through a bearing, and is projected into the first arm 25 while passing through a central portion of the dividing table 227. Timing pulleys 282, 283 are fixed on both upper and lower end faces of an outer cylindrical hollow shaft 281 of the rotating shaft 28. The lower-end timing pulley 283 is coupled to a timing pulley 241 and a timing belt 242 secured to an output shaft 24a of the dc motor 24 for driving a ball-bearing spline nut, which will be described later.

An inner shaft 285 passing through the inner portion of the outer cylindrical hollow shaft 281 is supported through a bearing so as to be rotatable independently of the outer cylindrical hollow shaft 281, and has timing pulleys 286, 287 coupled thereto at both upper and lower end portions thereof. The lower-end timing pulley 287 is coupled to a timing pulley 231 and a timing belt 232 that are secured to the output shaft 23a of the dc motor 23 for driving a ball-bearing leadscrew nut, which will be described later.

Then, a construction of the second arm 26 will be described.

The shaft of the second arm 26 that extends vertically while passing through the horizontally extending first arm 25 is a ball-bearing leadscrew shaft 261. Not only a spiral ball screw groove 262, which is a gothic arch groove, but also three axially extending linear ball spline grooves 263 are formed on the ball-bearing leadscrew shaft 261, and a ball-bearing leadscrew nut 264 and a ball-bearing spline nut 265 are attached to the ball-bearing leadscrew shaft 261, respectively.

The ball-bearing leadscrew nut 264 has a gothic arch ball screw groove corresponding to the gothic arch ball screw groove 262 over a not shown inner circumferential surface thereof. A great number of balls are interposed between the ball screw groove of the nut and the ball screw groove 262 of the ball-bearing leadscrew shaft 261 so as to be rotatable. Although not shown, ball circulation paths are formed inside the ball-bearing leadscrew nut 264, so that the balls move spirally while rolling within the screw groove in association with the rotation of the ball-bearing leadscrew shaft 261 and the ball-bearing leadscrew nut 264 relative to each other, return to the original position via a return passage arranged within the nut after having made one and a half or three and a half rotations around the screw groove, and repeat the circulation. That is, the ball-bearing leadscrew nut 264 has such a known construction.

On the other hand, the ball-bearing spline nut 265 has ball spline grooves corresponding to the ball spline grooves 263 linearly extending along the ball-bearing leadscrew shaft 261 over a not shown inner circumferential surface. A great number of not shown balls are interposed between the ball screw groove of the nut and the ball screw groove 262 of the ball-bearing leadscrew shaft 261 so as to be rotatable. Although not shown, ball circulation paths are formed inside the ball-bearing spline nut 265, so that the balls move linearly while rolling within the screw groove in association with the linear movement of the ball-bearing leadscrew shaft 261 and the ball-bearing spline nut 265 relative to each other, make a U-turn along a return path arranged within the nut upon reaching the end portion of the nut, and repeat the circulation.

The ball-bearing leadscrew nut 264 is rotatably supported by a housing 251 of the first arm 25 through a ball bearing 266, and has a timing pulley 267 fixed on an end thereof. On the other hand, the ball-bearing spline nut 265 is rotatably supported by the housing 251 of the first arm 25 through a cross roller bearing 268, and has a timing pulley 269 fixed on an end thereof.

The timing pulley 267 secured to the ball-bearing leadscrew nut 264 is coupled to the timing pulley 286 by a timing belt 267A, the timing pulley 286 being disposed on the upper end of the inner shaft 285 that transmits the rotation of the dc motor 23 for driving the ball-bearing leadscrew nut.

On the other hand, the timing pulley 269 secured to the ball-bearing spline nut 265 is coupled to the timing pulley 282 by a timing belt 269A, the timing pulley 282 being disposed on the upper end of the outer cylindrical hollow shaft 281 that transmits the rotation of the dc motor 24 for driving the ball-bearing spline nut.

The robot hand 27 is mounted on the lower end of the ball-bearing leadscrew shaft 261 through a housing 271. The damping unit 30 is mounted on the hand 27.

Figure 2:
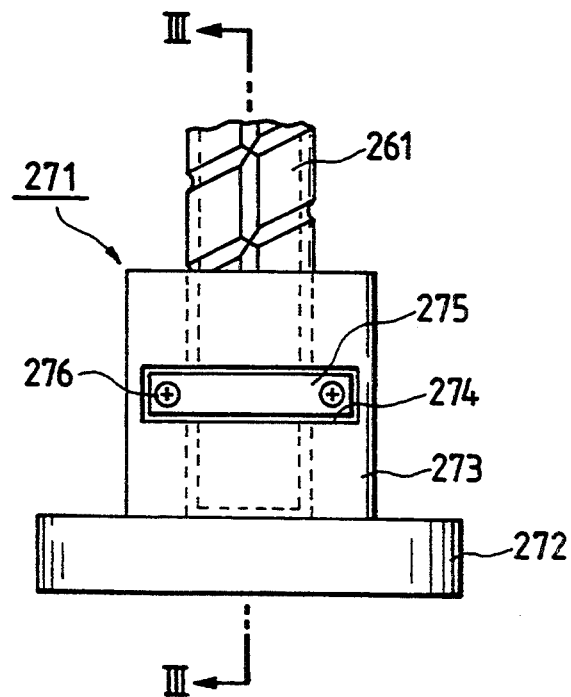
FIG. 2 is a sectional view illustrative of a damping unit mounting structure.
Figure 3:
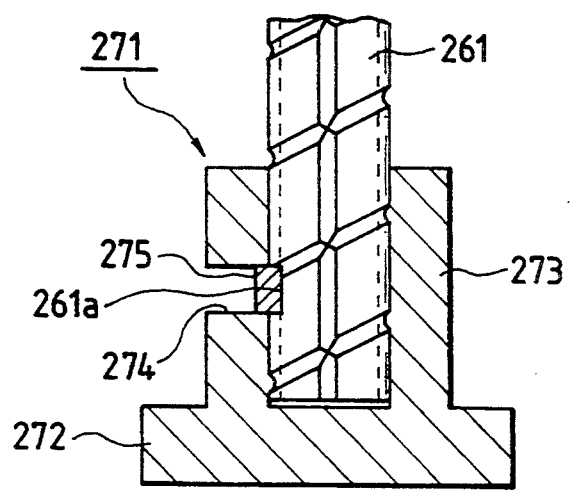
FIG. 3 is a sectional view taken along a line III—III of FIG. 2.
Figure 4:
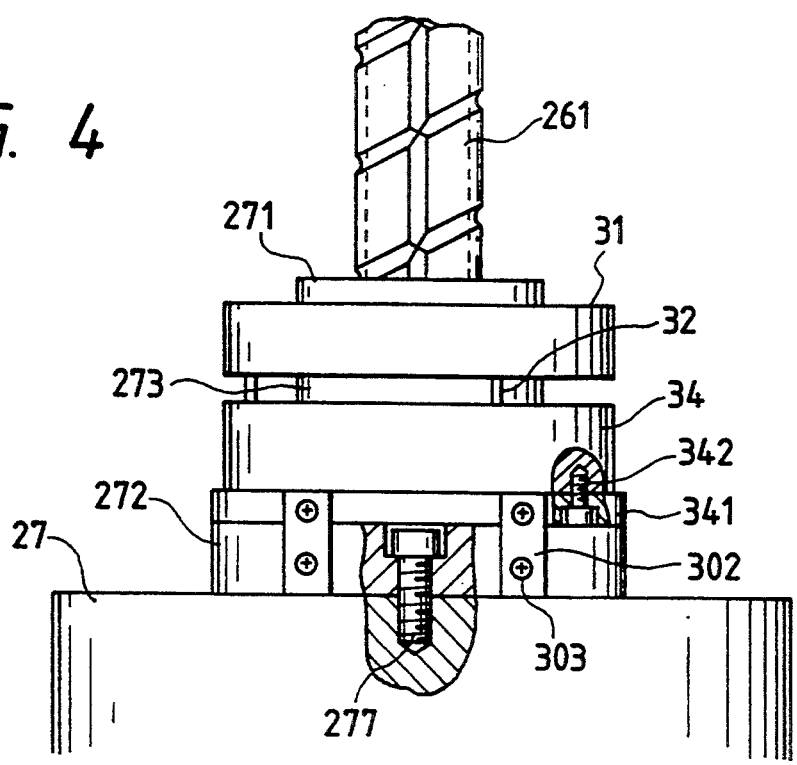
FIG. 4 is a sectional view illustrative of a damping unit mounting structure.

The hand 27 mounting structure will now be described with reference to FIGS. 2 to 4.

The housing 271 has a flange 272 and a cylindrical barrel portion 273. A notch 274 is arranged on a lateral surface of the barrel portion 273. The housing 271 is non-rotatably mounted on the ball-bearing leadscrew shaft 261 by fitting a shaft securing plate 275 into the notch 274, engaging the shaft securing plate with a notched groove 261a arranged on a lateral surface of the ball-bearing leadscrew shaft 261 in advance, and tightening screws 276. The hand 27 is secured by a bolt 277 so as to contact the lower surface of the flange 272 of the housing 271.

The damping unit 30 is attached to the hand 27, which is a working head disposed on the distal end of the ball-bearing leadscrew shaft 261 through the housing 271 that is secured to the distal end of the ball-bearing leadscrew shaft 261 as described above.

That is, the damping unit 30 has a housing insertion hole in a central portion thereof, and is inserted into the ball-bearing leadscrew shaft 261 before the hand 27 is secured to the ball-bearing leadscrew shaft 261 as described above. After the housing 271 with the hand 27 mounted thereon has been secured to the ball-bearing leadscrew shaft 261 by the shaft securing plate 275, the barrel portion 273 of the housing 271 is inserted into the housing insertion hole. Then, not only the lower surface of the damping unit 30 is abutted against the upper surface of the flange 272 of the housing 271, but also rectangular damper securing plates 302 are stretched over the lateral surface of the flange 272 of the housing and the lateral surface of the damping unit 30, and tightened with screws 303. The damper securing plates 302 are arranged at four positions equidistantly over the circumference, ensuring the coupling between the housing 271 and the damping unit 30.

Figure 5:
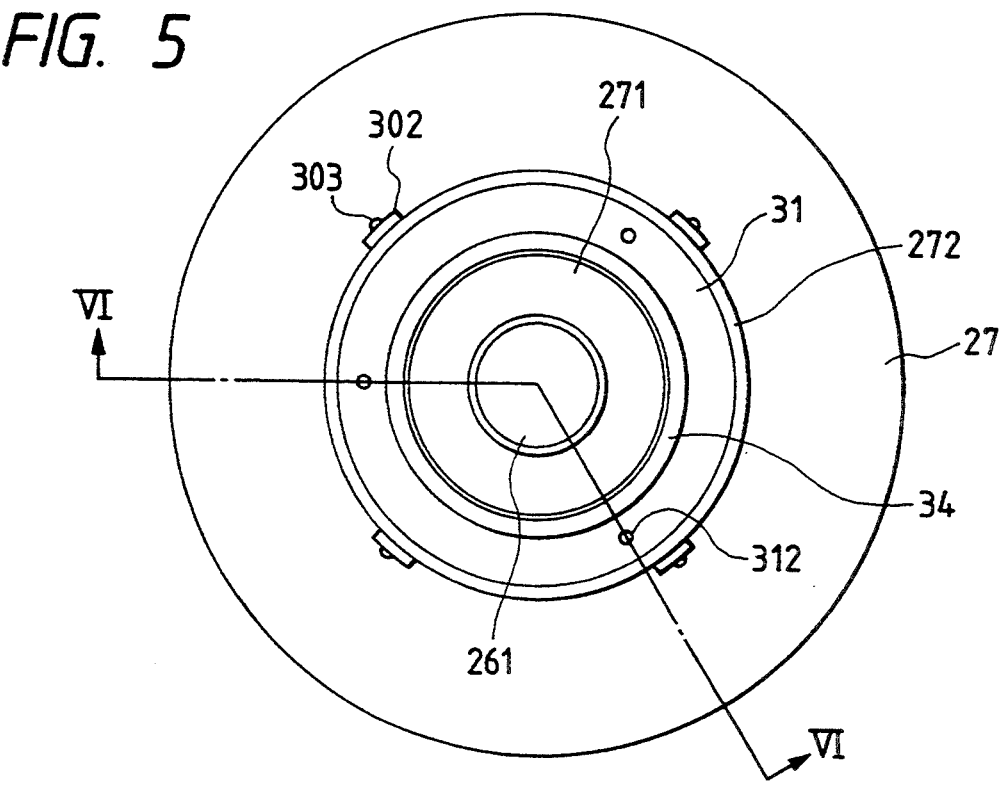
FIG. 5 is a top plan view of FIG. 4.

A detail of the damping unit 30 is shown in FIGS. 5 and 6.

The damping unit 30 according to the embodiment includes: a ringlike mass body 31; wirelike resilient members 32; an auxiliary damper cover 34 with fluid chambers 33, each fluid chamber enclosing each resilient member 32; and a fluid 35 having a high viscosity charged within the fluid chambers 33.

The mass body 31 is a metal ring whose inner diameter is larger than the outer diameter of the barrel portion 273 of the housing 271, and is mounted while interposing a gap 311 with respect to the housing 271. Accordingly, the center of gravity of the mass body 31 is located at the center of the operating shaft having the hand 27, which is a working head, i.e., at the center of the ball-bearing leadscrew shaft 261. The mass body 31 is also movable in a direction orthogonal to the axis of the screw shaft. Thin through holes 312 axially passing through the thick portion are located at trisected positions on the circumference. Screw holes reaching the through holes 312 from the outer circumferential surface are formed in two steps, upper and lower, to which machine screws 313 are attached.

A plurality of resilient members 32 (three resilient members) are arranged, each being made of a metallic wire such as, e.g., piano wire. The upper end sides thereof are inserted into the three through holes 312 of the mass body 31, respectively, and retained in the mass body 31 while fastened with the machine screws 313. Each resilient member 32 extends downward in parallel with the axis of the ball-bearing leadscrew shaft 261.

The auxiliary damper cover 34 is, e.g., a metal ring formed into a round ringlike form, and is loosely fitted into the barrel portion 273 of the housing 271. The auxiliary damper cover 34 has through holes at trisected positions on the circumference of the thick portion thereof. Each through hole forms a fluid chamber 33. The resilient member 32 passes through the middle of each fluid chamber 33. Therefore, each fluid chamber 33 is disposed so as to enclose the resilient member 32. As shown in FIG. 4, a damper base ring 341 is secured to the lower surface of the auxiliary damper cover 34 with a bolt 342 to close the lower ends of the fluid chambers 33. Axially extending thin through holes 342 are provided at trisected positions on the circumference. Screw holes reaching the through holes 342 from the outer circumferential surface are formed, and machine screws 343 are attached thereto. The lower ends of the resilient members 32 are inserted into the through holes 342, respectively, and retained and secured to the damper base ring 341 with the machine screws 343.

Here, when the machine screws 313 are loosened, the retainment of the resilient members 32 with the mass body 31 is released, thereby allowing the mounting position of the mass body 31 to be adjusted by vertically sliding the mass body 31. Thus, each machine screw 313 serves as the mass body 31 mounting position adjusting means together with the resilient member 32.

For example, silicon grease 35 is charged into the fluid chambers 33 of the auxiliary damper cover 34 as a high-viscosity fluid.

The operation will now be described.

When the coils of the stator 222 of the direct drive motor 22 are energized through the not shown drive unit with the not shown clamp mechanism unclamped, the respective teeth of the stator 222 are excited in a predetermined sequence to rotate the rotor 223. The angle of rotation of the rotor 223 is detected by the resolver 228, and the detected signal is fed back to the not shown drive unit, so that the angle of rotation of the rotor 223 is regulated to obtain correct division of the dividing table 227.

Upon completion of the dividing operation, the dividing table 227 is clamped by the clamp mechanism. The first arm 25 of the robot is rotated together with the dividing table 227 and is fixed at a predetermined position by the clamp of the dividing table 227. Accordingly, the hand 27 of the robot is horizontally swiveled and positioned. Since the motor of this embodiment is of such a high torque type that the motor rotor 223 is provided between both inner and outer stators 222A, 222B, the motor can transfer a high load.

The vertical movement of the robot hand 27 and the rotational movement thereof around the ball-bearing leadscrew shaft 261 are effected by the driving of the ball screw device constituting the second arm 26. That is, by driving the ball-bearing leadscrew nut 264 and the ball-bearing spline nut 265 through the timing belts 267A, 269A with the dc motors 23, 24, respectively, the ball-bearing leadscrew shaft 261 is driven, which operates the hand 27.

If the dc motor 23 is started, the rotation of the output shaft 23a thereof is transmitted to the timing pulley 231, the timing belt 232, the timing pulley 287, the inner shaft 285, the timing pulley 286, the timing belt 267A, and the timing pulley 267 to rotate the ball-bearing leadscrew nut 264. By rotating only the ball-bearing leadscrew nut 264 in this way, the ball-bearing leadscrew shaft 261 makes a vertical movement in the axial direction in accordance with the direction of rotation.

If the dc motor 24 is started, the rotation of the output shaft 24a thereof is transmitted to the timing pulley 241, the timing belt 242, the timing pulley 283, the outer cylindrical hollow shaft 281, the timing pulley 282, the timing belt 269A, and the timing pulley 269 to rotate the ball-bearing spline nut 265. By rotating only the ball-bearing spline nut 265 in this way, the ball-bearing leadscrew shaft 261 makes a movement in the axial direction accompanying a rotational movement.

If the ball-bearing leadscrew nut 264 and the ball-bearing spline nut 265 are rotated in the same direction at the same rpm together, the ball-bearing leadscrew shaft 261 only rotates without moving in the axial direction. If the ball-bearing leadscrew nut 264 and the ball-bearing spline nut 265 are driven at different rpms, the ball-bearing leadscrew shaft 261 makes a movement combining both rotational movement and axial movement. When the direction of rotation is reversed, the directions of the respective movements are also reversed.

In setting the hand 27 by moving the hand 27 to a predetermined position in this way, the damping unit 30, which is the embodiment of the invention, is employed to effectively prevent residual vibration at the time the hand 27 is stopped.

Since the damping unit 30 is so designed that the ringlike mass body 31 is supported by the damper base ring 341 through the wirelike resilient members 32 and that the gap 311 is interposed between the mass body 31 and the housing 271, the damping unit 30 is movable in the radial direction, allowing vibration to be absorbed effectively. In addition, the vibration of each resilient member 32 that slides while supporting the mass body 31 can be effectively damped by the viscosity resistance of the high viscosity grease 35 that encloses each resilient member.

In a dynamic damper having the mass body 31, the resilient members 32, and the fluid chambers 33 to which viscous fluid 35 functioning as a damper is charged, it is assumed that the mass of the mass body 31 is m; the mass of the hand 27, which is the object to be damped, is M; and the ratio between both masses is $\mu = m/M$. According to the optimal design method of the dynamic damper, optimal synchronization of the dynamic damper for effectively suppressing resonance can be expressed by the following equation (1).

$$\omega_n/\Omega_n = 1/(1+\mu) \quad (1)$$

where $\omega_n = (k/M)^{\frac{1}{2}}$ is the natural vibration of the dynamic damper; and $\Omega_n = (K/M)^{\frac{1}{2}}$ is the natural vibration of the object to be damped (k and K are the respective spring constants).

Optimal damping can be expressed by the following equation (2).

$$\zeta = [3\mu/8(1+\mu)]^{\frac{1}{2}} \quad (2)$$

where $\zeta = c/2 \, (mk)^{\frac{1}{2}}$ is the damping factor of the dynamic damper (c is the damping coefficient of the dynamic damper). The height of a resonance peak at this moment can be suppressed as indicated by the following equation (3).

$$(X_1/X_{st})_{max} = (1 + 2/\mu)^{\frac{1}{2}} \quad (3)$$

where $X_1/X_{st}$ is the multiplying factor of amplitude of the object to be damped. The value $\mu$ of the equation (3) is determined by specifying the desired height to which the object is damped. If the natural vibration $\Omega_n$ and mass M of the object to be damped are known, the mass m of the dynamic damper is first determined, and the spring constant k and the damping coefficient c are then determined from the equation (1) and the equation (2), respectively.

Figure 8:
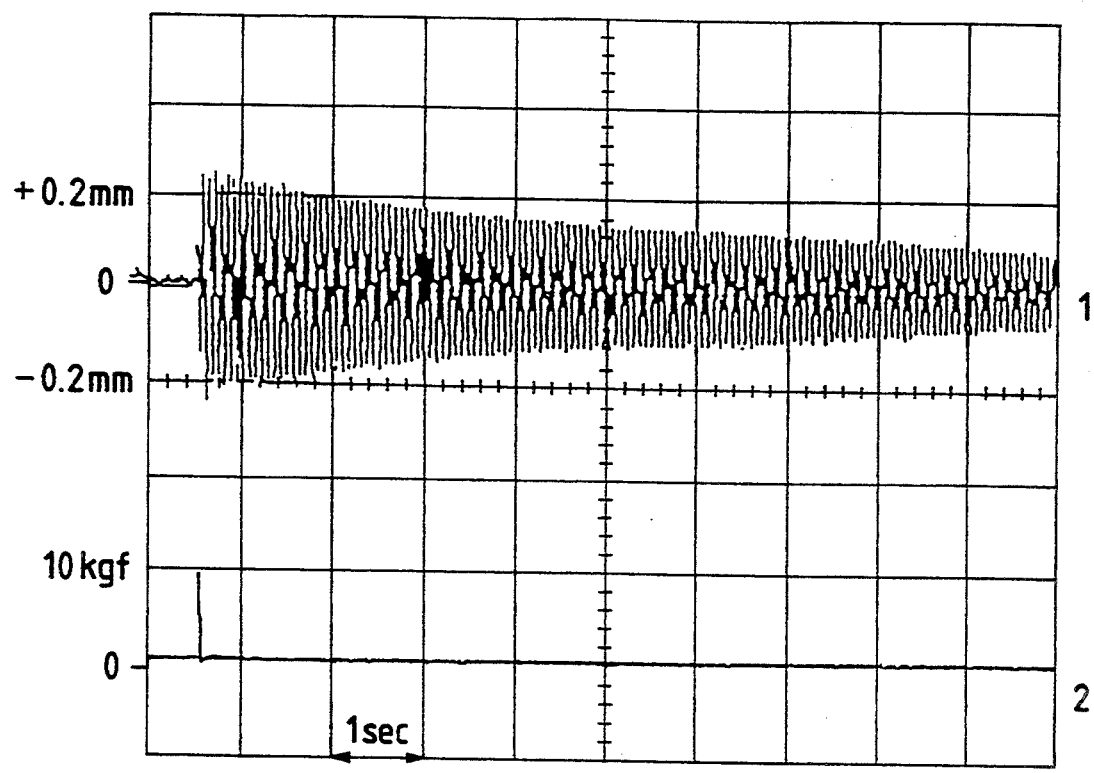
FIG. 8 is a graph showing vibration in the case where the damping unit is not used in FIG. 7.
Figure 9:
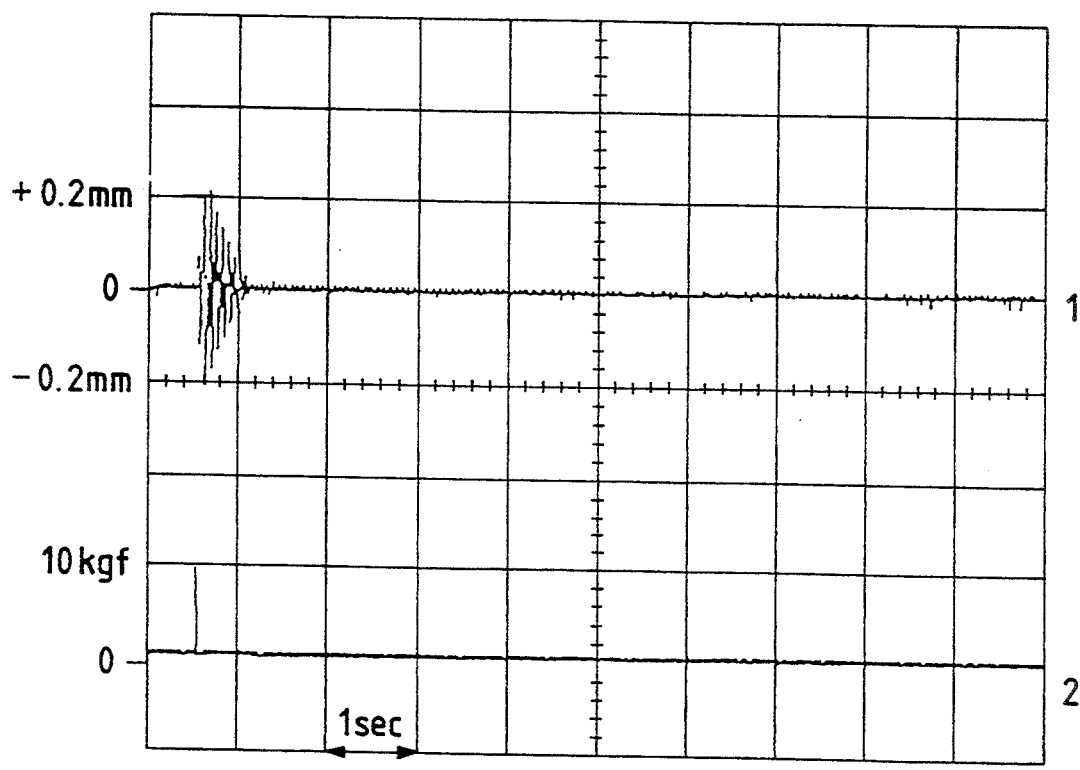
FIG. 9 is a graph showing vibration in the case where the damping unit is used in FIG. 7.
Figure 11:
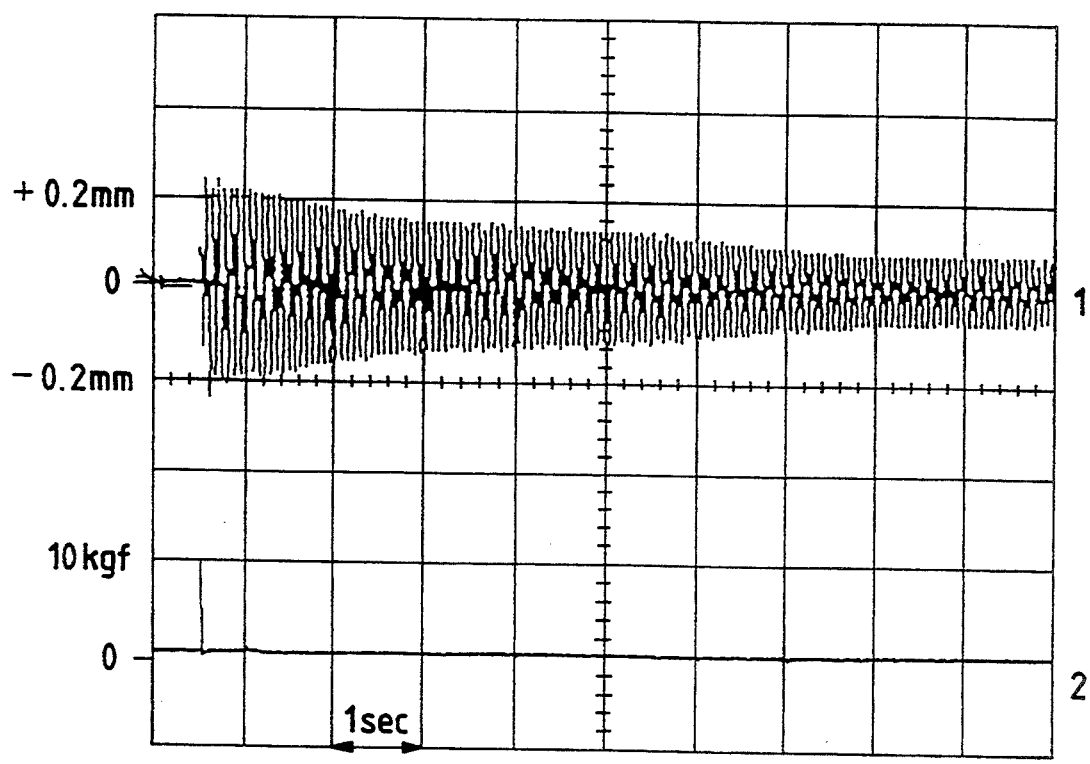
FIG. 11 is a graph showing vibration in the case where the damping unit is not used in FIG. 10.
Figure 12:
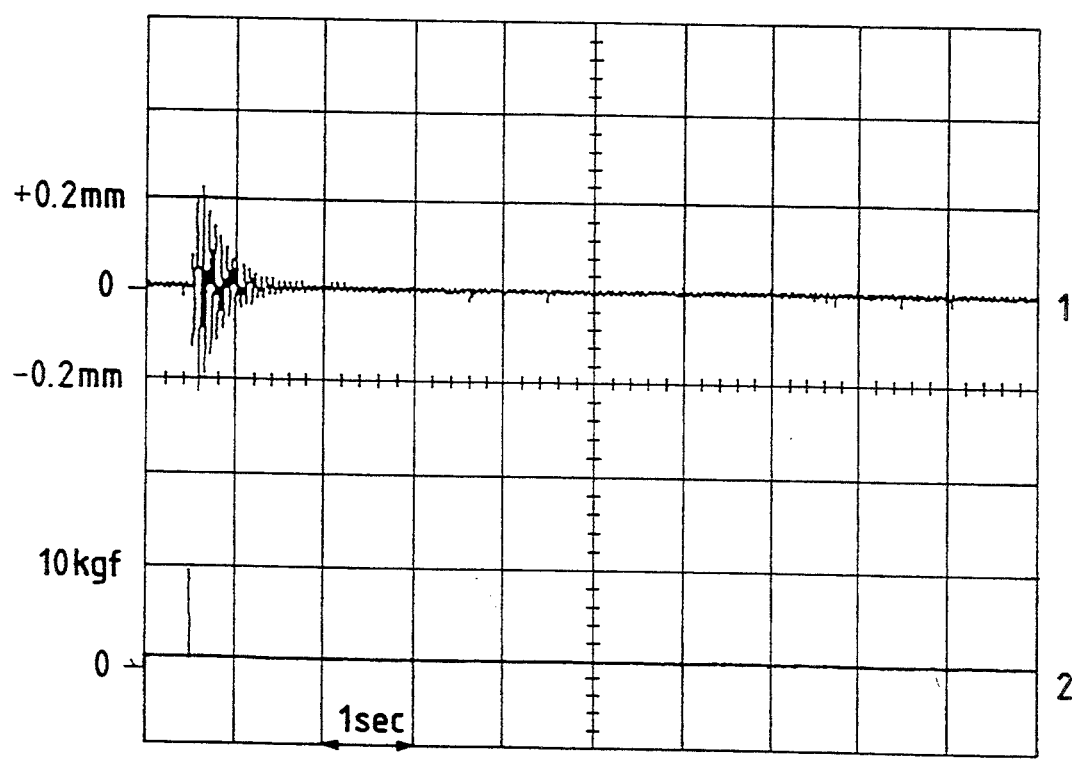
FIG. 12 is a graph showing vibration in the case where the damping unit is used in FIG. 10.
Figure 15:
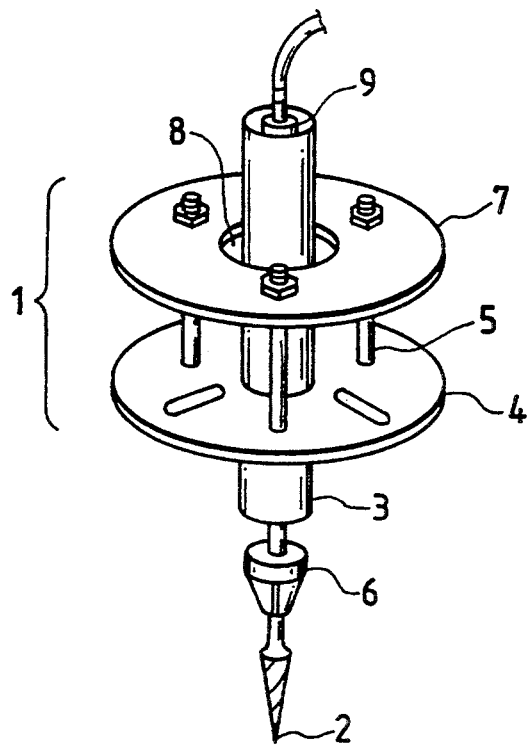
FIG. 15 is a perspective view showing an example of a conventional vibration absorbing damper.
Figure 16:
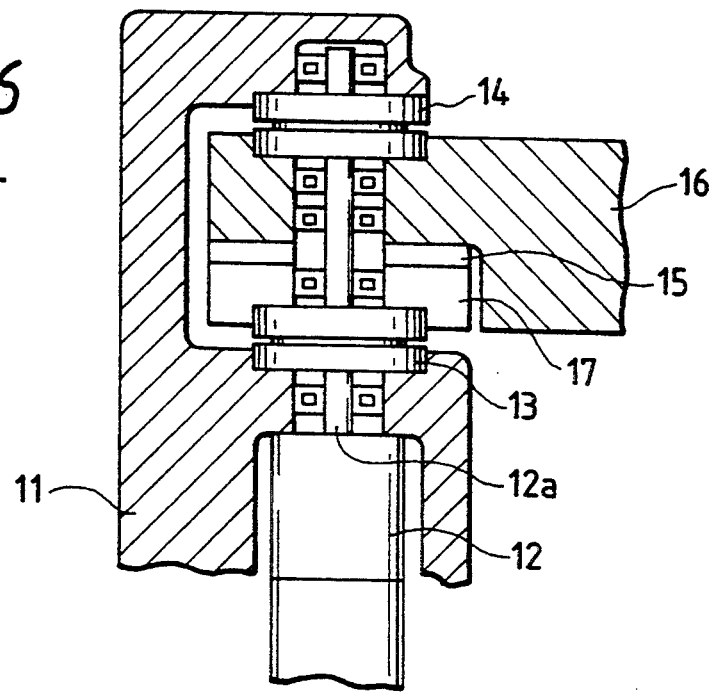
FIG. 16 is a sectional view of a joint structure of a robot to which another conventional vibration absorbing damper is applied.

Examples of impulse responses of the hand 27 to which the damping unit 30 whose factors have been thus determined is applied are shown in FIGS. 7 to 12. FIG. 7 is a schematic diagram showing a position of the hand 27 to which vibration is applied and a position of the hand 27 at which response is made; FIG. 8 is the same when the damping unit 30 is not employed; and FIG. 9 is the same when the damping unit 30 is employed. FIGS. 10 to 12 show examples of impulse responses with the direction in which vibration is applied to the hand 27 is shifted 90° out of phase. FIG. 10 is a schematic diagram showing a position of the hand 27 to which the vibration is applied and a position of the hand 27 at which response is made; FIG. 11 is the same when the damping unit 30 is not employed; and FIG. 12 is the same when the damping unit 30 is employed. All the graphs clearly indicate that the vibration damping characteristic depends on the use of the damping unit 30. The abscissa of the graphs indicates the time and the ordinate, the vibration displacement and the force with which vibration is applied.

In the case of, e.g., replacing the hand 27, which is the object to be damped, the natural vibration changes, which accordingly changes the optimal synchronization and the optimal damping, causing the damping effect to be reduced if no measures are taken. In such a case, however, the embodiment can maintain the optimal synchronization at all times by adjusting the length of the resilient members 32 while loosening the machine screws 313, which are the mass body 31 position adjusting means, because such adjustment can change the spring constant k, which can change the natural vibration of the damping unit 30 easily.

FIGS. 13 and 14 show a damping unit 30, which is another embodiment of the invention.

In this embodiment, fluid chambers 33A of the damping unit 30 are different from those of the above-mentioned embodiment. That is, each fluid chamber 33A is formed of a cylindrical container 331, and the resilient member 32 passes through a central portion thereof. A collar 332 and a screw 333 are provided on a lower end portion of each resilient member 32. The resilient member 32 is secured to the damper base ring 341 by tightening the screw 333 to the nut. The viscous fluid 35 is charged into the container 331, which is covered with a bellows. This embodiment is advantageous in that the cylindrical auxiliary damper cover 34 can be dispensed with and that replacement of the viscous fluid 35 can be implemented by replacement of the container 331 as a whole. The damping function and effect of this embodiment are similar to those of the above embodiment.

As described in the foregoing, the invention is characterized as including: the mass body supported at a position close to the end of the operating shaft having the working head in such a manner as to be movable in a direction orthogonal to the axis of the operating shaft; the wirelike resilient members, one end of each resilient member supporting the mass body and the other end thereof being fixed in parallel with the axis of the operating shaft; the fluid chambers disposed so as to enclose the resilient members; and the high-viscosity fluid being charged into the fluid chamber. As a result of this construction, the natural vibration of the dynamic damper can be optimized (optimal synchronization) as well as the damping coefficient is optimized (optimal damping) with ease by adjusting the ratio between the weight of the mass body and that of the working head as well as the spring constant of the resilient members. In addition, sufficient damping effects can be achieved to the residual vibration of low frequency; the viscous resistance of the fluid provided around the resilient members allows the absorbing performance of the dynamic damper to be implemented almost to a maximum extent; and the simple design of the damping unit is contributory to sufficiently controlling the vibration. Consequently, even if applied to a cantilevered structural body such as the distal end of a hand of a robot, the invention can provide a number of practical advantages of not having to increase the static rigidity and making the apparatus light.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A damping unit comprising:
    a base member (341) secured relative to a working head which is mounted on a end of an operating shaft (261) thereof;
    a mass body (31) supported at a position close to the end of said operating shaft so as to be movable in a direction orthogonal to an axis of said operating shaft;
    a wirelike resilient member (32) fixed on said base member for supporting said mass body, said wirelike resilient member being extended in parallel with the axis of said operating shaft; and
    a fluid charged member (34,331) having a fluid chamber (33, 33A) into which a high-viscosity fluid (35) is charged, said wirelike resilient member passing through the fluid chamber.

2. A damping unit according to claim 1, in which said mass body comprises a metal ring (31).

3. A damping unit according to claim 1, in which said resilient member comprises three resilient members each made of a metallic wire.

4. A damping unit according to claim 3, in which said fluid charged member comprises a metal ring having through holes each defining said fluid chamber at trisected positions on the circumference of said metal ring.

5. A damping unit according to claim 1, in which said high-viscosity fluid comprises a silicon grease (35).

6. A damping unit according to claim 1, in which said fluid charged member comprises a cylindrical container (331).

* * * * *